Patented Oct. 13, 1942

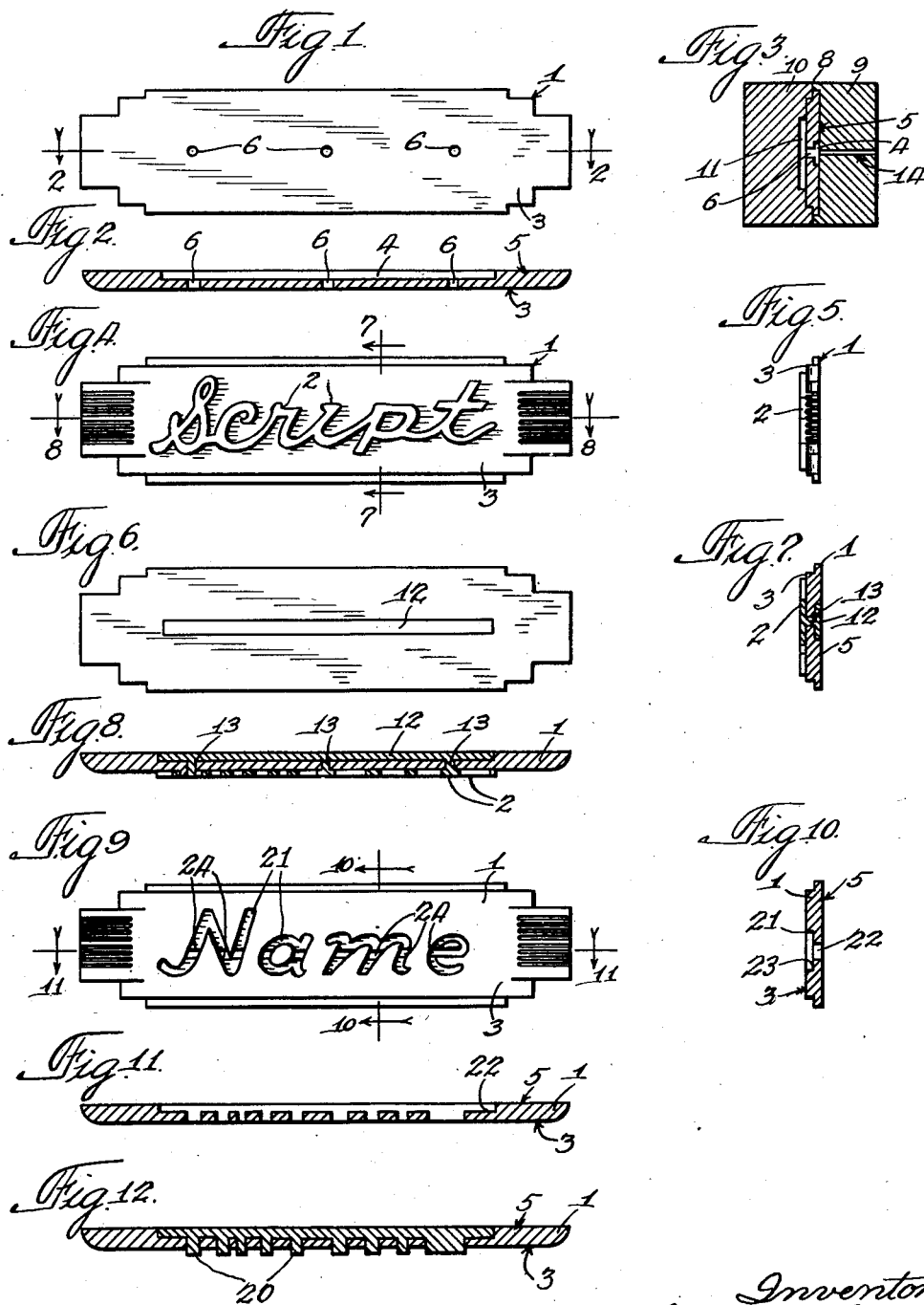
Oct. 13, 1942.   J. A. GITS ET AL   2,298,365
METHOD OF MOLDING NAME PLATES
Original Filed March 12, 1938   2 Sheets-Sheet 1
Inventors:
Joseph A. Gits
Jules P. Gits Oct. 13, 1942. J. A. GITS ET AL 2,298,365
METHOD OF MOLDING NAME PLATES
Original Filed March 12, 1938 2 Sheets-Sheet 2
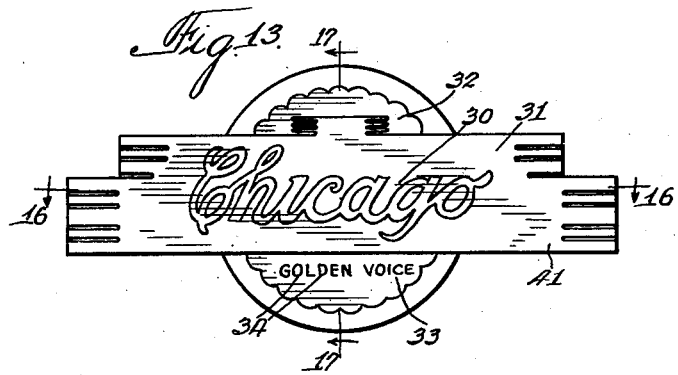
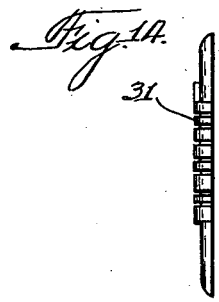
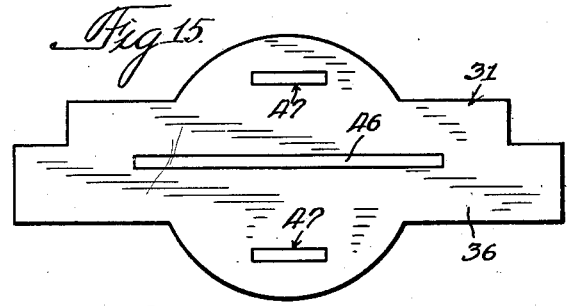
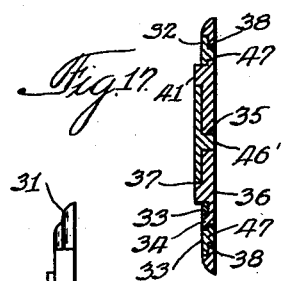
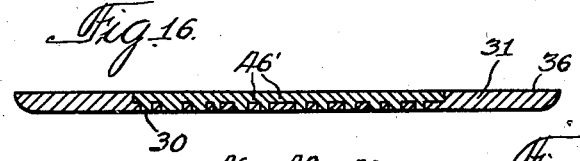
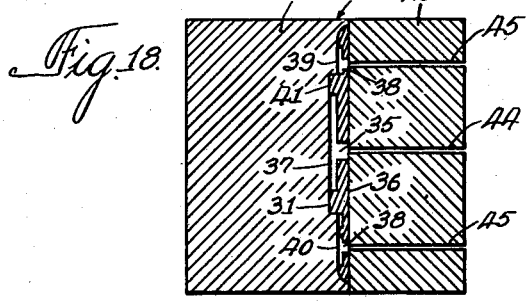
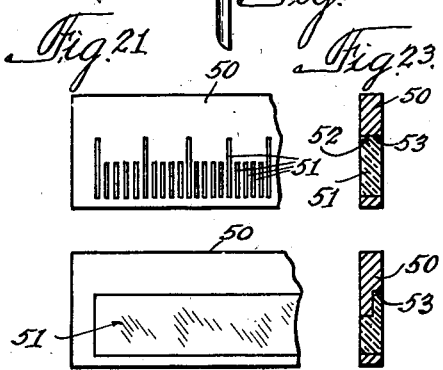
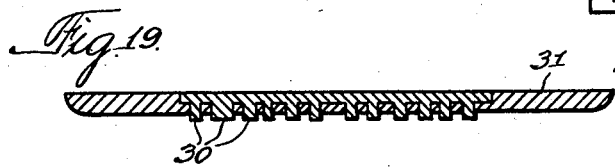
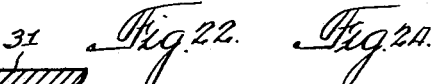

2,298,365

UNITED STATES PATENT OFFICE 2,298,365

METHOD OF MOLDING NAME PLATES

Joseph A. Gits and Jules P. Gits, Chicago, Ill., assignors to Gits Molding Corporation, Chicago, Ill., a corporation of Illinois Original application March 12, 1938, Serial No. 195,504. Divided and this application November 18, 1939, Serial No. 305,051

13 Claims. (Cl. 18—61)

This invention relates to name plates or like articles, and is directed more particularly to an improved construction wherein characters, insignia or other surfaces are formed upon the plate in a distinctive and novel manner.

The invention has been illustrated herein as being embodied in name plates and therefore as being particularly adapted thereto, but it will be understood that the invention is not necessarily limited in its application and usefulness to name plates, but may be used elsewhere.

The present case is directed to the method of making the product disclosed herein and is a division of our parent application, Serial No. 195,504, filed by us March 12, 1938, wherein the product is disclosed and claimed.

Name plates are commonly molded of plastic materials and are widely used at the present time. Before the molding operation, pigments are frequently added to the plastic materials to obtain the color desired. The name, characters or other insignia are formed upon the plates in the molds in a single operation, the characters or insignia being formed by being recessed in or by being molded upon the surface in relief. Any attempt to secure a proper contrasty effect between the characters and the name plate by painting either the characters or the name plate has met with difficulty and has failed to produce satisfactory results. Cellulose compositions particularly will not satisfactorily retain paint upon their surfaces. The paint may adhere temporarily but any subsequent handling will not only soil the same but cause it to be quickly worn free. Moreover, painting operations involve labor and are costly. If the name plates are dipped and then wiped, there is a considerable loss. Wiping will invariably remove portions of the paint from the surfaces to be painted and often an undesirable smeary appearance will result. It is a step that is difficult for a workman to perform. If raised or inlaid surfaces are on the plates for decorative purposes, and are not to receive the same color as the characters or the plates or other insignia, painting by dipping cannot be resorted to. Hand painting with a brush is likewise laborious and involves many difficulties from a production standpoint. The same is true whether the name or insignia is inlaid or carried upon the plate in relief.

An essential object of this invention is to provide a construction and a method for producing the same, that will overcome the difficulties above noted and permit the manufacture of molded name plates, as well as other articles, in a simple and inexpensive manner and have a name or other insignia molded upon the plate as an integral part thereof but of a different color, if desired, than that of the plate. Moreover, different portions of the name plate that are provided for decorative purposes and not a part of the name, characters or insignia upon the plate, may be likewise formed of different colors so as to carry out the decorative scheme along extensive lines.

A further object of this invention resides in the simple operation of securing the aforesaid results by a second molding operation but in a manner effecting a bond between the portions of the first and second operations that will be permanent, and, for all essential purposes, will give the appearance of being made in one operation, the portions also appearing to be of the same material except for their difference in color.

Specifically, the invention is to be noted for the type of bond secured that makes separation of the different portions practically impossible. The portions formed by the second operation are so intimately united with the name plate, by the bonding action produced, that it is physically impossible to effect a separation without destruction.

Although a bonding action securing a mechanical interlock between the characters or other insignia and the name plate is also disclosed, it will be understood that the manner in which the molding operation is performed may, in itself, secure a bond that will effectively unite the parts into one unit and prevent their easy separation.

The type of mechanical interlock between the characters or other insignia and the name plates, which we have disclosed herein, is however, a feature of the invention that is considered of importance and has advantage and benefits which are of much value in this kind of work.

Other objects and advantages of the invention will be noted from the following detail description of the invention when taken in connection with the accompanying drawings which form a part hereof.

In the drawings:

Figure 1 is an elevation of a name plate looking at its front face before any characters or symbols are formed thereon;

Fig. 2 is a horizontal sectional view taken on line 2—2 of Fig. 1;

Fig. 3 is a vertical sectional view taken through a mold in which this name plate has been placed for a second molding operation;

Fig. 4 illustrates the name plate in finished form after the second molding operation;

Fig. 5 is an end view of the same;

Fig. 6 is an elevation of the rear face of this finished name plate;

Fig. 7 is a vertical sectional view taken on line 7—7 of Fig. 4;

Fig. 8 is a horizontal sectional view taken on line 8—8 of Fig. 4;

Fig. 9 is a slightly modified form of name plate before characters or symbols are formed thereon, having recesses therein conforming to the characters to be formed;

Fig. 10 is a vertical sectional view taken on line 10—10 of Fig. 9;

Fig. 11 is a horizontal sectional view taken on line 11—11 of Fig. 9;

Fig. 12 is a view similar to Fig. 11 but after the second operation forming the letters or symbols;

Fig. 13 illustrates a further variant embodiment of the invention;

Fig. 14 is an end view of the same;

Fig. 15 is a view of the rear face of the same;

Fig. 16 is a horizontal sectional view taken on line 16—16 of Fig. 13;

Fig. 17 is a vertical sectional view taken on line 17—17 of Fig. 13;

Fig. 18 illustrates the type of name plate that is shown in Fig. 13 positioned in a mold and ready for a second operation to form the characters and other surfaces thereon;

Fig. 19 is a horizontal sectional view of a name plate of the type shown in Fig. 13 but illustrating the characters in slight relief instead of being flush;

Fig. 20 is an end view of the name plate shown in Fig. 19;

Fig. 21 is a view of a further embodiment of the invention as applied to surfaces adapted to have transparent markings or calibrations thereon;

Fig. 22 is a rear view of the same;

Fig. 23 is a vertical sectional view of the same taken through the larger markings; and Fig. 24 is a vertical sectional view taken through the smaller calibrations.

Name plates and articles capable of embodying the present invention are usually adapted to have their characters, symbols or surfaces formed or carried upon their front face in various ways. According to the invention, these letters, symbols or surfaces may be either inlaid and formed in relief or flush with the surface, or not inlaid and formed upon the surface in relief only. Accordingly, it may be mentioned at the outset with respect to a broad aspect of the invention that it is immaterial how these characters, symbols or faces are formed or carried and that the features of the invention may be incorporated in various types of structures whether they comprise name plates or other articles wherein it is desirable to form component parts thereof out of differently colored material by separate molding operations to make them in effect appear as an integral part of the plate or article, although being material of different color and formed by a separate molding operation.

Fig. 1 illustrates a name plate 1 before the molding operation forming the characters. Fig. 4 illustrates name plate 1 in its finished form after the characters are formed. In this illustration, however, letters designated 2 are formed in relief upon front face 3, the latter being substantially smooth and against which the letters 3 are held. A recess 4 is formed in rear face 5. A plurality of passages or small openings 6 place recess 4 in communication with front face 3. As will be described presently, formation of recess 4 and the provision of passages 6 will depend upon the manner in which letters 2 are to be formed upon front face 1. If letters 2 are to form a word written in script, passages 6 are provided in any desired number, irrespective of whether the plate 1 is recessed to receive a portion of the material forming letters 2 as will be hereinafter described, or whether these letters 2 are carried against front face 1, as shown in Fig. 4.

After plate 1, as shown in its form in Fig. 1, is formed, it is placed in a second mold 8 so that its rear face 5 is positioned against the face of the mold's matrix 9 and openings 6 communicates with a cavity 11 cut in patrix 10. Cavity 11 corresponds to the letters or characters of the word or symbol to be molded upon front face 1. One or more passages 14 in matrix 9 communicate with recess 4 and the source of supply of the plastic composition. It is this plastic composition that is of a different color than plate 1 and it preferably enters recess 4, opening 6 and cavity 11 by an injection operation under a relatively high pressure. For example, we have found pressures in the order of thirteen to fifteen tons per square inch may be advantageously used to insure that the molten material will be forced into all portions of cavity 11 and that a bond will be, by reason of this high pressure, formed between the letters 2 and plate 1 that will firmly hold the letters against the plate and prevent their separation independently of any mechanical interlocking key means herein disclosed.

The arrangement of recess 4 in rear face 5 advantageously furnishes, however, key means 12 in the shape of an integrally formed strip that may lie substantially the length of the word or symbol formed by letters 2. This strip 12 is integrally interlocked with letters 2 by the connections 13 formed by this material of the second operation filling passages 6.

Although recess 4 may be of any cross-sectional shape or configuration, we find that the mechanical interlocking action or keying may be materially strengthened or made more efficient by providing passages 6 of different cross-section than recess 4. Consequently, extensions 13 will be of different shape cross-sectionally than strip 12, which prevents any tendency for letters 2 to be stripped from front face 3. In other words, not only will injection-molding under high pressure in itself provide a bond of adequate strength to unite letters 2 to the front face 3 of plate 1 but the mechanical interlocking action furnished by extensions 13 and strip 12 will mechanically interlock letters 2 with plate 1 so as to make them an integral-like part of the plate. A product or article is thereby produced that comprises in effect a base or background of one material or color and characters or symbols carried thereby of the same or different material or of a different color, so as to produce the appearance of a structure whose characters or symbols are an integral part thereof but have a definitely different appearance or color than the base. An exceptionally firm bond or mechanical interlock is provided to assure that the characters will not be separated from the base. The advantages of the construction are numerous. Characters or symbols may be formed upon a name plate that will be of a different color than that of the base and will thereby present a desirable contrasty appearance without any possibility of the color changing or being removed which was heretofore experienced when the characters or symbols were painted. A very neatly finished product is obtained that has a proper finished appearance and which may be produced at a greatly reduced cost and eliminate the labor difficulties of painting operations.

As stated above, the letters or characters forming the symbol or other indicia to be formed upon the name plate may have a portion thereof embedded in a recess in the front face of the plate. Such a construction is illustrated in Figs. 9 to 12, inclusive. In this instance, plate I is provided in its first molding operation with a recess or plurality of recesses 21 in its front face 3 corresponding to the shape or configuration of the letters or characters to be formed. If desired, these letters or characters may be individually formed, as shown at 20 in Fig. 12, and not connect with each other, as shown in Fig. 4. Plate I will, therefore, be formed with a plurality of recesses 21, each corresponding to some portion of the symbol, such as each letter of the name to be formed. Rear face 5 will be provided with a recess 22 extending somewhat lengthwise of the area covered by the word to be formed on front face I. Recess 22 may be so formed in plate I as to extend at least to the floor 23 of recesses 21 and thereby be in communication therewith. It will be observed that each recess 21 will have one or more openings 24 with recess 22. Floor 23 of these recesses will be cut away where these recesses intersect with recess 22. Adequate communication between recess 22 and recesses 21 will be provided to assure a proper flow of material into recesses 21 to form letters 20. If these letters 20 are to be formed in relief with respect to front face 3 of plate I, the patrix 10 of mold 8 may likewise have corresponding cavities II that will form the individual letters 20. Again, plate I is placed in mold 8 for a second injection operation to secure a flow of the differently colored material forming words 20 through recess 22 and then into the recesses 21.

A device embodying the present invention may not only have letters or characters forming symbol or like indicia of a differently colored material thereon but may have a surface ornamentation likewise constructed. Such a structure is shown in Figs. 13 to 18, inclusive. It may comprise, for example, letters 30 forming a trade name or like indicia that is of a differently colored material than plate 31, and also comprise a number of surfaces 32 and 33 formed of a still differently colored material, it also being possible to form additional lettering 34 upon surface 33 of the same or different color than that of the letters 30. Letters 30 are formed in a second molding operation in the same manner as above explained. Plate 31 is first molded with a recess 35 in rear face 36 extending inwardly in the body of plate 31 to intersect the floor of recesses 37. Also, additional recesses 38 similar to that of recess 35 may be provided in plate 31 at the rear face 36 to communicate with recesses 39 and 40 formed in front face 41. This is clearly shown in Figs. 17 and 18. In the second molding operation, plate 31 is placed in a mold 42, illustrated in Fig. 18. Patrix 43 may have a series of passages 44 and 45 communicating with recesses 35 and 38, respectively. The patrix 46 may, in this instance, receive plate 31 by having the proper cavity formed in its face. If preferred, the arrangement may provide letters 30 and surfaces 32 and 33 flush with the front face of the plate instead of in relief, as shown in the variant embodiments above described. It will be understood that the formation of the letters 30 and surfaces 32 and 33 with respect to whether they will be flush, recessed or in relief will depend upon the manner in which the cavities are formed in the molds.

In this second injection-molding operation, the differently colored material forming letters 30 will not only fill recesses 37 in the front face of plate 31 but also recess 35 formed at the rear face 36. This material will form a mechanical interlocking key 46' in recess 35 that will securely hold letters 30 in their recesses 37 although it will be understood that injection-molding under high pressure may effectively form a bond that will prevent letters 30 from being displaced from their recesses 37 independently of key means 46'. Again recess 35 may assume any proper shape to perform its function and permit adequate access to recesses 37 to assure an efficient and proper flow of the material into said recesses 37.

Injecting the material into recesses 39 and 40 to form surfaces 32 and 33 may be performed during the same injection operation forming letters 30 or by another operation, if so desired. Also, the material injected into recesses 39 and 40 will form key means 47 in recesses 38 that will provide the proper mechanical interlocking action to keep surfaces 32 and 33 firmly held in recesses 39 and 40. It will be understood, however, that recesses 38 extending lengthwise of surfaces 32 and 33 may be dispensed with and other communication with front recesses 39 and 40 provided. Instead of a single recess 38 for each surface 32 and 33 one or more openings (similar to openings 6) extending through back wall 36 into recesses 39 and 40 will suitably serve the purpose. This is a matter of construction and choice.

As shown in the drawings, letters 34 are molded or formed as a part of plate 31. See Fig. 17. However, letters 34 may be formed during the second molding operation to be given a different color or appearance instead of surface 33, or surface 33 may be formed in the second molding operation and thereafter letters 34 in a subsequent operation. This is a matter of choice.

Figs. 19 and 20 further illustrate a construction substantially the same as shown in Figs. 13 to 17, inclusive. However, letters 30 project slightly in relief upon the front face of plate 31. As stated previously, it will be apparent that any desirable arrangement in this connection may be provided without departing from the scope of the invention. The same is true with such surfaces as 32 and 33, shown in Fig. 13.

A device made in accordance with this invention may be subjected to any number of molding operations. Surfaces like 32 and 33 and characters like any of those herein described, or other types or kinds of symbols that are possible to form, may be made in more than one or two colors. Certain surfaces or characters on a single article may be both inlaid and in relief. The combinations are numerous as will be apparent from the foregoing description and a proper understanding of the invention and the advantages and benefits obtained.

Not only has a new product been produced, but also a novel process devised that efficiently and economically produces this new product and overcomes many difficulties heretofore experienced.

The value of the present process in obtaining name plates or like articles with differently colored combinations of parts that go to make up these name plates or like articles in a simple and economical manner is pointed out. These plates or articles have a finished appearance that, with their color variances, make them very attractive and exceedingly useful.

The letters, characters, symbols, surfaces, or whatever may be formed by the second operation, have the appearance of being an integrally formed component part of the product. This has value and importance, not only from the construction and sales standpoints, but also from the use thereof and the appeal it presents.

Figs. 21 to 24 illustrate a further possible embodiment of the invention in the form of a dial 50 having markings or calibrations 51 formed therein that are transparent or translucent and capable of illumination by a light disposed at the rear of the dial. The construction of dial 50 and markings 51 is substantially the same as described in connection with other embodiments disclosed herein. If desired, dial 50 is provided with a recess or recesses 52 in the front face corresponding to the markings 51. It is then provided with a longitudinal recess 53 in the rear face preferably of a height at least equal to markings 51 and of a length to include all the marking across the front face. It will be understood, however, that this recess 53 in the rear face may be made up of any number of recesses or parts thereof as long as its intended purpose will be accomplished. This recess 53 in the rear face is preferably of a depth to intersect the recesses 52 in the front face so that the arrangement results in the front recesses 52 opening into the rear recess 53, as shown in Figs. 23 and 24. Dial 50 is then placed in a mold and these recesses are filled with a transparent or translucent material, the material in the rear recess forming a key to lock the markings 51 against displacement, it being noted that the shape of the rear recess 53 renders displacement of the transparent material forming the markings 51 in the front recesses 52 impossible. Hence, a dial construction may be conveniently and inexpensively provided that may be of any shape but which have transparent markings or calibrations permitting rear illumination.

It is to be understood that the disclosure of the process herein described and claimed and of its variant embodiments is a disclosure of any product or products that may be produced thereby.

Without further elaboration, the foregoing will so fully explain the gist of our invention that others may, by applying current knowledge, readily adopt the same for use under varying conditions of service, without eliminating certain features, which may properly be said to constitute the essential items of novelty involved, which items are intended to be defined and secured to us by the following claims.

We claim:

1. A method of molding a plastic product having portions formed of differently colored materials which comprises making a body of material of one color with recesses in one of its sides corresponding to the configuration of one or more of said portions, injecting under relatively high pressure material of a different color in said recesses to form said one or more portions upon said side by said injection operation, and effecting a bond by said high pressure injection that unites said portions with said body to form in effect a single integrally formed unit that distinguishes said portions from said body substantially by color separation only.

2. A method of molding indicia in a body having opposed front and rear faces so that said indicia is exposed along the front face which comprises forming indicia-conforming recesses of predetermined depth in said body along said front face, forming a recess in said body along said rear face, making said recess of a depth and cross-sectional formation that it will intercept and communicate with said indicia-conforming recesses at a plurality of predetermined points, rendering workable and fluid by heat a mass of plastic material of a different color than the material of said body and injecting the fluid material into said indicia recesses and said intercepting recess to form said indicia and to fill said intercepting recess until said material is flush with said rear face, and effecting a permanent bond between said body and the fluid material in said recesses when it hardens to form in effect an integrally formed unit distinguishing the material in said recesses from said body substantially by color separation only.

3. A method of molding indicia to be exposed upon the front face of a body having relatively opposed front and rear faces which comprises forming an elongated recess in said body along the rear face substantially in the direction of one dimension of said indicia to be formed to communicate with the front face at a number of places, injecting a fluid indicia-forming material into said elongated recess to flow into and through said places of communication to form said indicia upon the front face, and effecting a permanent bond between said body and the fluid material in said recesses when it hardens that forms in effect an integrally formed unit.

4. A method of molding indicia upon a body having relatively opposed front and rear faces so that said indicia is exposed along the front face which comprises forming a recess in said body along the rear face, providing a number of communicating passages between said recess and the front face, placing said body in a mold having an indicia-conforming recess therein exposed to the front face of said body and said communicating passages, and injecting indicia-forming material into said recess in the rear face of said body through said communicating passages and into said indicia-conforming recess in said mold to fill both said indicia-conforming recess and said recess in the rear face and form a permanent bond between said body and the injected material when it hardens.

5. The method of forming a plastic product such as a name plate having alphabetical formations or other like indicia portions disposed upon the front face of the plate in contrasting colors which comprises first providing a plate composed of a plastic material having a finished front face and a rear face, providing a recess in the finished front face of the contour of an alphabetical formation or other indicia portion to be formed and a recess in the rear face in a plane parallel to the plane occupied by the recess in the front face so that the floors of both recesses are generally parallel to each other, making both said recesses of a depth so that the floor of the recess in the rear face intercepts the floor of the recess in the front face where the recess in the front face crosses the recess in the rear face to provide a communicating opening therebetween that occupies a portion only of the floor of the recess in the front face but provides a flow communication with the entire recess in the front face, and forcing a molten mass of plastic material of a contrasting color into the recess in the rear face and through said communicating opening until both the recess in the rear face and the recess in the front face are filled under a pressure that forms a permanent bond between the plate and the molten plastic material and causes the contacting surfaces of the plate and the molten plastic material to so intimately unite when the molten plastic material cools that the separation between the plate and the hardened plastic material will appear to be defined substantially by color separation only.

6. The method of forming a plastic product having alphabetical formations or other like indicia portions disposed upon the front face of the same in contrasting colors which comprises first providing a molded body of a plastic material having front and rear faces, providing a recess in the front face of the contour of an alphabetical formation or other indicia portion to be formed, providing a recess in the rear face of a depth causing its floor to intercept the floor of the recess in the front face to provide a communicating opening or openings that occupy a portion only of the floor of the recess in the front face but provide a flow communication with the entire recess in the front face, and forcing a molten mass of plastic material of a contrasting color through the recess in the rear face until both the recess in the rear face and the recess in the front face are filled under a pressure forming a permanent bond between the molded body and the molten plastic material causing the contacting surfaces of the molded body and the molten plastic material to so intimately unite when the molten plastic material cools that the separation between the plate and the hardened plastic material will appear to be defined by color separation only.

7. The method of forming a plastic product such as a name plate having alphabetical formations or other like indicia portions disposed upon the front face of the plate in contrasting colors which comprises first providing a plate composed of a plastic material having a front face and a rear face, providing one or more recesses in the front face of the contour of an alphabetical formation or other indicia portion to be formed, providing a recess in the rear face, making said recess in the rear face of a depth and forming it across the rear face so that it will intercept each recess in the front face to provide a flow communication that occupies a portion only of the floor area of each recess in the front face, flowing a molten mass of plastic material into said recesses so that by reason of said flow communication therebetween all said recesses in both front and rear faces are filled under a pressure forming a permanent bond between the plate and the molten plastic material causing the contacting surfaces of the plate and the molten plastic material to so intimately unite when the molten plastic material cools that the separation between the plate and the hardened plastic material will appear to be defined by color separation only.

8. The method of forming a plastic product such as a name plate having alphabetical formations or other like indicia portions disposed upon the front face of the plate in contrasting colors which comprises first providing a plate composed of a plastic material having a front face and a rear face, providing one or more recesses in the front face of the contour of an alphabetical formation or other indicia portion to be formed, providing a recess in the rear face, making said recess in the rear face of a depth and forming it across the rear face so that it will intercept each recess in the front face to provide openings therewith that occupy a portion only of each recess in the front face, forcing a molten mass of plastic material of a contrasting color through the recess in the rear face and said openings until all of each recess in the front face is filled under a pressure that forms a permanent bond between the plate and the molten plastic material and causes the contacting surfaces of the plate and the molten plastic material to so intimately unite when the molten plastic material cools that the separation between the plate and the hardened plastic material will appear to be defined by color separation only.

9. The method of forming a plastic product such as a name plate having alphabetical formations or other indicia portions disposed upon the front face of the plate in contrasting colors which comprises first providing a plate composed of a plastic material having a front and a rear face, providing a recess in the rear face that extends crosswise of the area to be occupied by the alphabetical or other like indicia portion upon the front face but of a depth less than the thickness of the plate, forming communicating openings in the plate between the rear recess and the front face at points to be covered by the alphabetical or other indicia to be formed, rendering workable and fluid by heat a mass of plastic material which is of a color contrasting with the color of the material of the plate, placing the plate in a die provided with a cavity of the shape of the alphabetical or other indicia to be formed with the front face of the plate facing the cavity, forcing the fluid mass of plastic material into the die so that by reason of the communicating openings in the plate both the cavity and the recess in the rear face are filled, the molten mass being forced into the die under a pressure causing the plate and the molten mass when cooled to form a permanent bond wherein the contacting surfaces of the plate and the hardened mass of plastic material are so intimately united that the separation between the same will appear to be defined by color separation only.

10. The method of forming a plastic product such as a name plate or the like having alphabetical formations or other indicia portions disposed upon the front face of the plate in contrasting colors which comprises first providing a plate composed of plastic material having a front and a rear face, providing a recess in the rear face that extends crosswise of the area to be occupied by the alphabetical or other like indicia portion upon the front face but of a depth less than the thickness of the plate, forming communicating openings in the plate between the rear recess and the front face at points to be covered by the alphabetical or other indicia to be formed, rendering workable and fluid by heat a mass of plastic material which is of a color contrasting with the color of the material of the plate, placing the plate in a die, forcing the fluid mass of plastic material into the die to form the alphabetical or other indicia upon the front face so that by reason of the communicating openings in the plate the recess in the rear face is filled therewith and the alphabetical or other indicia is formed upon the front face, the fluid plastic material being forced into the die under a pressure causing the plate and the fluid plastic material when cooled to form a permanent bond wherein the contacting surfaces of the plate and the hardened plastic material are so intimately united that the separation between the same will appear to be defined by color separation only.

11. The method of forming a plastic product having a number of alphabetical or other like indicia formations arranged in a decorative manner and occupying different portions of the area of the front face and in color contrast with the front face which comprises providing a body of plastic material with recesses in the front face corresponding to the alphabetical or other like indicia portions to be formed, providing said recesses in the front face each with a definitely formed floor that lies within the body of said plate a predetermined distance, providing one or more recesses in the rear face of the body, arranging each such recess in the rear face in a crosswise relation with respect to certain or all of the recesses in the front face and with openings that communicate with said recesses in the front face, the openings occupying a portion only of the floor of said recesses in the front face but providing a flow communication with all of each of said recesses in the front face, injecting a molten mass of plastic material of a color contrasting with the color of the plastic material of the body into the recess or recesses in the rear face to fill all said recesses under a pressure intimately uniting the contacting surfaces of the body and the molten plastic material when it cools so that the body and the alphabetical or indicia formations appear to be made in a single forming operation.

12. The method of making a plastic article of contrasting colors by a double molding operation which includes, as the first step, the molding of a body of plastic material in a single operation with a recess in the front face and a recess in the rear face, said recesses having definitely formed floors that lie a predetermined depth within said body of plastic material with communicating openings therebetween that occupy a limited portion only of the floor of the recess of the front face, rendering workable and fluid by heat a mass of plastic material which is of a color contrasting with the color of the plastic material of the body, and, as the second step, filling both recesses with the fluid mass of plastic material of contrasting color by a single molding operation which includes injecting the fluid mass into one of the recesses under a pressure forcing the fluid mass into the other recess through said communicating openings to cause the contacting surfaces of the body and the fluid mass to intimately unite and form a permanent bond between both plastic materials that is distinguishable substantially by color separation only and to form the injected plastic material when it cools into a hardened mass of a cross section preventing displacement in any direction.

13. The method of molding indicia in a body having front and rear faces so that the indicia is exposed along the front face which comprises forming a recess in the front face and a recess in the rear face having a combined depth equal substantiallly to the thickness of the body, a recess in the rear face being arranged in the same general direction as the recess in the front face but of a different configuration so that the floors of both recesses intercept at limited points and provide openings therebetween, flowing a molten mass of material of different color than the color of the body into one of said recesses and through said openings to fill the other recess, and employing a pressure in flowing the molten mass to form a permanent bond between the same and the body when the molten mass cools.

JOSEPH A. GITS.
JULES P. GITS.